(12) United States Patent
Kurita et al.

(10) Patent No.: US 10,132,368 B2
(45) Date of Patent: Nov. 20, 2018

(54) ROLLER-TYPE ONE-WAY CLUTCH AND SIDE PLATE

(71) Applicant: NSK-WARNER K.K., Shinagawa-ku, Tokyo (JP)

(72) Inventors: Takashi Kurita, Fukuroi (JP); Tetsuya Wakamori, Fukuroi (JP); Ritsuo Toya, Fukuroi (JP)

(73) Assignee: NSK-WARNER K.K., Tokyo (JP)

( * ) Notice: Subject to any disclaimer, the term of this patent is extended or adjusted under 35 U.S.C. 154(b) by 207 days.

(21) Appl. No.: 15/035,046

(22) PCT Filed: Jun. 18, 2014

(86) PCT No.: PCT/JP2014/003263
§ 371 (c)(1),
(2) Date: May 6, 2016

(87) PCT Pub. No.: WO2015/068318
PCT Pub. Date: May 14, 2015

(65) Prior Publication Data
US 2016/0281800 A1    Sep. 29, 2016

(30) Foreign Application Priority Data

Nov. 8, 2013 (JP) ................................. 2013-232077

(51) Int. Cl.
*F16D 41/066* (2006.01)
*F16D 41/06* (2006.01)

(52) U.S. Cl.
CPC ............ *F16D 41/066* (2013.01); *F16D 41/06* (2013.01); *F16D 2041/0665* (2013.01)

(58) Field of Classification Search
CPC ...... F16D 41/06; F16D 41/064–41/067; F16C 19/24–19/26
See application file for complete search history.

(56) References Cited

U.S. PATENT DOCUMENTS

2009/0277739 A1  11/2009  Takasu
2010/0096236 A1   4/2010  Ando

FOREIGN PATENT DOCUMENTS

JP     60-026822 A    2/1985
JP     64-058837 A    3/1989
(Continued)

OTHER PUBLICATIONS

English Translation of International Preliminary Report on Patentability from International Patent Application No. PCT/JP2014/003263, dated May 8, 2016.
(Continued)

*Primary Examiner* — Richard M Lorence
(74) *Attorney, Agent, or Firm* — Shapiro, Gabor and Rosenberger, PLLC

(57) ABSTRACT

A roller type one-way clutch includes an outer race in which at least one pocket having a cam surface on an inner periphery thereof is formed, an inner race which is spaced away from the outer race on an inside diameter side in a radial direction and which is relatively rotatably disposed concentrically with respect to the outer race, a roller which is disposed in the pocket and which engages with the cam surface to transmit a torque between the outer race and the inner race, a spring which is disposed between the outer race and the roller in the pocket and which urges the roller in a direction in which the roller engages with the cam surface, and a side plate secured to be in contact with one end surface in an axial direction of the outer race. The side plate has a non-circular shape, the one end surface in the axial direction is annular, and at least a portion of the one end surface in the axial direction of the outer race is exposed in a state in which the side plate is secured.

16 Claims, 9 Drawing Sheets

(56) References Cited

FOREIGN PATENT DOCUMENTS

| | | |
|---|---|---|
| JP | 05-044615 A | 2/1993 |
| JP | 2009-138815 A | 6/2009 |
| JP | 2009-138816 A | 6/2009 |
| JP | 2010-096327 A | 4/2010 |
| JP | 2010-281346 A | 12/2010 |
| JP | 5118550 B | 1/2013 |
| WO | WO 2010/140457 A1 | 12/2010 |

OTHER PUBLICATIONS

International Search Report from International Patent Application No. PCT/JP2014/003263, dated Sep. 22, 2014.
International Preliminary Report on Patentability from International Patent Application No. PCT/JP2014/003263, dated Mar. 1, 2016.

ROLLER-TYPE ONE-WAY CLUTCH AND SIDE PLATE

TECHNICAL FIELD

The present invention relates to a roller type one-way clutch used as a component for torque transmission, backstop or the like in a drive unit of, for example, an automobile, an industrial machine or the like, and a side plate used with a roller type one-way clutch.

BACKGROUND ART

In general, a roller type one-way clutch is composed primarily of an outer race in which at least one pocket having a cam surface on an inner periphery thereof is formed, an inner race which is disposed concentrically with the outer race and which has an outer peripheral track surface, a roller which is disposed in the pocket and which transmits a torque between the outer peripheral track surface of the inner race and the inner peripheral cam surface of the outer race, and a spring which is in contact with the idling side of the roller.

In the roller type one-way clutch having the configuration described above, the inner race is rotated only in one direction with respect to the outer race by a cam mechanism composed of a roller and a cam surface. More specifically, the inner race is configured to idle in one direction with respect to the outer race and impart a rotational torque to the outer race through the intermediary of the cam mechanism only in the opposite direction.

For example, a one-way clutch used with a starter for a two-wheel vehicle is subjected to severe vibration due to high revolutions and also to heavy dust. Hence, foreign substances, such as wastes containing abrasion powder, tend to accumulate in the one-way clutch. The foreign substances in the one-way clutch adversely affect the engaging performance, so that it is desirable to promptly remove the foreign substances in order to improve the reliability of the one-way clutch.

Meanwhile, there is a roller type one-way clutch used with the starter of a two-wheel vehicle, as the one described in Patent Document 1, in which a side plate having a spline groove which is provided in the inside diameter portion thereof and with which a member, such as an engine crankshaft, engages, is bolted to the outer race of the one-way clutch.

Further, Patent Document 2 describes a side plate provided with a foreign substance discharge hole through which foreign substances are discharged to the outside. The annular side plate is secured to an end surface in the axial direction of an annular outer race which has substantially the same diameter as that of the side plate.

CITATION LIST

Patent Document

[Patent Document 1]
Japanese Patent Application Laid-Open No. 5-044615
[Patent Document 2]
Japanese Patent No. 5118550

SUMMARY OF INVENTION

However, the conventional side plates are circular and cover one annular end surface in the axial direction of an outer race. Hence, there has been a problem in that a large quantity of a material is used and press-working the side plate results in a low yield, thus failing to meet the demand for a reduction in manufacturing cost.

Therefore, an object of the present invention is to provide a roller type one-way clutch and a side plate which reduce the quantity of a material and improve a yield thereby to reduce manufacturing cost by adopting a non-circular shape for the side plate.

To this end, a roller type one-way clutch in accordance with the present invention includes:

an outer race in which at least one pocket having a cam surface on an inner periphery thereof is formed;

an inner race which is spaced away from the outer race on an inside diameter side in a radial direction and which is relatively rotatably disposed concentrically with respect to the outer race;

a roller which is disposed in the pocket and which engages with the cam surface to transmit a torque between the outer race and the inner race;

a spring which is disposed between the outer race and the roller in the pocket and which urges the roller in a direction in which the roller engages with the cam surface; and a side plate secured to be in contact with one end surface in an axial direction of the outer race, wherein the side plate has a non-circular shape, the one end surface in the axial direction is annular, and at least a portion of the one end surface in the axial direction of the outer race is exposed in a state in which the side plate is secured.

Further, to this end, a side plate used with a roller type one-way clutch in accordance with the present invention is a side plate used with a roller type one-way clutch that includes an outer race in which at least one pocket having a cam surface on an inner periphery thereof is formed, an inner race which is spaced away from the outer race on an inside diameter side in a radial direction and which is relatively rotatably disposed concentrically with respect to the outer race, a roller which is disposed in the pocket and which engages with the cam surface to transmit a torque between the outer race and the inner race, and a spring which is disposed between the outer race and the roller in the pocket and which urges the roller in a direction in which the roller engages with the cam surface, wherein one end surface in the axial direction of the outer race is annular, the side plate has a non-circular shape and is secured to be in contact with the end surface in the axial direction, and at least a portion of the one end surface in the axial direction of the outer race is exposed in a state in which the side plate is secured.

Effect of the Invention

According to the roller type one-way clutch and the side plate in accordance with the present invention, the side plate has a non-circular shape, one end surface in the axial direction is annular, and at least a portion of the one end surface in the axial direction of the outer race is exposed in a state in which the side plate is secured. This arrangement makes it possible to reduce the quantity of a material used for the side plate and improve the yield, thus permitting a reduction in manufacturing cost.

According to the roller type one-way clutch and the side plate in accordance with the present invention, the side plate has a non-circular shape to reduce the quantity of the material used for the side plate, thus enabling the roller type one-way clutch to have a reduced weight.

Further, since the pocket adapted to be exposed beyond the side plate, it is possible to reduce the quantity of the material used for the side plate, improve the yield and ensure the function for discharging foreign substances from the pocket.

DESCRIPTION OF EMBODIMENTS

Figure 1:
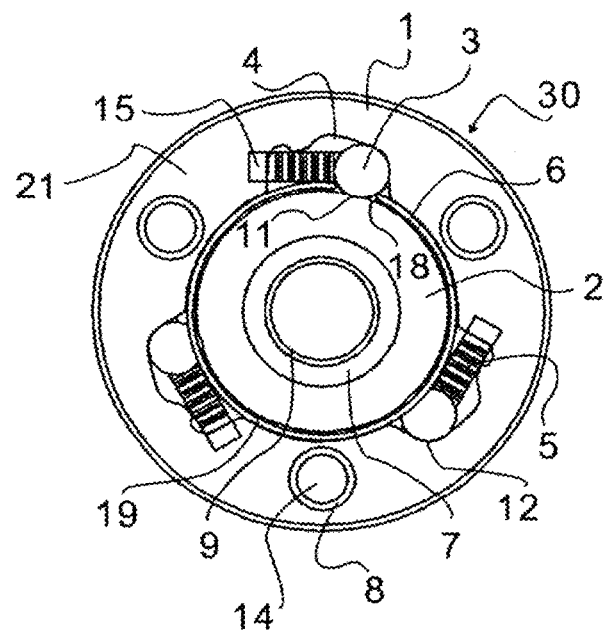
FIG. 1 is a front view illustrating a roller type one-way clutch to which the embodiments of the present invention can be applied.

The following will describe in detail the embodiments of the present invention with reference to the accompanying drawings. The like reference numerals in the drawings will denote like or corresponding portions. It is needless to say that the embodiments described below are merely illustrative of the present invention and other modifications can be made.

FIG. 1 is a front view illustrating a roller type one-way clutch to which the embodiments of the present invention can be applied. FIG. 1 illustrates a state in which rollers are in engagement with cam surfaces, i.e. the roller type one-way clutch is being engaged and locked under a high load. In FIG. 1, an annular side plate is provided on the rear side of the drawing, and only a portion of the central portion thereof is illustrated.

As illustrated in FIG. 1, a roller type one-way clutch 30 includes an annular outer race 1 having, in the inner periphery thereof, a plurality of pockets 4 formed as recesses with cam surfaces 12, an inner race 2 which is spaced away from the outer race 1 on the inside diameter side in the radial direction and relatively rotatably disposed concentrically with respect to the outer race 1 and which has an annular outer periphery track surface 11, and rollers 3 which are disposed in the pockets 4 to transmit a torque between the outer periphery track surface 11 of the inner race 2 and the inner periphery cam surfaces 12 of the outer race 1.

The roller type one-way clutch 30 further includes springs 5 which are disposed in the pockets 4 to urge the rollers 3 in a direction for engaging with the cam surfaces 12, a retainer 6 which retains the rollers 3, and a conventional side plate 7 which has a spline groove 9, with which an engine crankshaft or the like engages, in an inside diameter portion thereof and which is secured to the outer race 1 by swaging with rivets 14 so as to be in contact with an end surface 21 in the axial direction of the outer race 1. The retainer 6 is secured neither to the outer race 1 nor the inner race and is relatively rotatable with respect to the outer race 1 and the inner race 2.

Referring to FIG. 1, the outer race 1 is provided with the pockets 4 at three locations at equal intervals in the circumferential direction. Further, holes 8 which are used to secure the side plate 7 to the outer race 1 by the rivets 14 and which pass through in the axial direction are also provided at three locations at equal intervals in the circumferential direction. It is needless to say that the number of the pockets 4 may be set to, for example, three to six according to a required magnitude of torque.

The retainer 6 has windows 18 in a number corresponding to the number of the rollers 3. The windows 18 pass through in the radial direction but are closed on a flange 17 side and also on an end portion 19 side opposing the flange 17 in the axial direction. In the circumferential direction, the window widths are smaller than the roller diameters. More specifically, each of the rollers 3 is seated in each of the windows 18, which has a substantially rectangular shape having four sides, thus making it possible to prevent each of the rollers 3 from falling in the direction of the inside diameter. In order to illustrate the relationship between the windows 18 and the rollers 3, the window 18 at the top in the drawing is illustrated with the end portion 19 cut away in FIG. 1.

Figure 3:
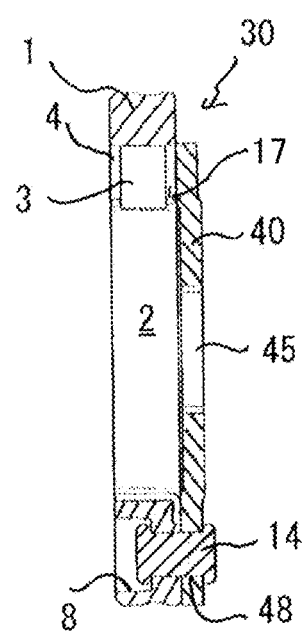
FIG. 3 is a sectional view in an axial direction taken along line III-III in FIG. 2.

One end of each of the springs 5, namely, a tab 15, is locked onto the end surface in the axial direction of the outer race 1, as illustrated in FIG. 1, and the other end, namely, a tab 16, is held between the end surface in the axial direction of the roller 3 and the flange 17 of the retainer 6, as illustrated in FIG. 3. With this arrangement, the springs 5 themselves are supported in a fixed manner with respect to the outer race 1, thus making it possible to prevent the springs 5 from falling off and also to prevent the rollers 3 from falling off in the axial direction.

The springs 5 are accordion springs. Alternatively, however, springs having other shapes, such as coil springs, may be used.

The embodiments of the present invention, which will be described below, share the same constituent elements as those described with reference to FIG. 1 except for the side plate, so that the description of the same constituent elements will be omitted.

First Embodiment

Figure 2:
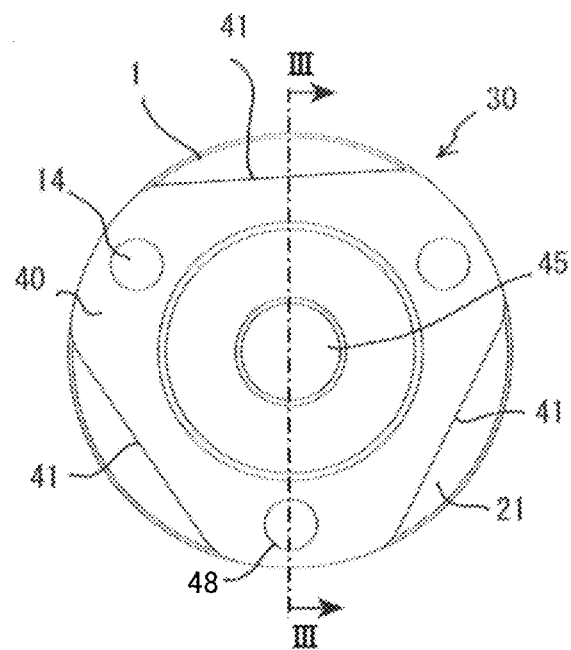
FIG. 2 is a front view illustrating a roller type one-way clutch according to a first embodiment of the present invention.

FIG. 2 is a front view illustrating a roller type one-way clutch according to a first embodiment of the present invention, and FIG. 3 is a sectional view in the axial direction taken along line III-III in FIG. 2.

As illustrated in FIG. 2, a side plate 40 of a roller type one-way clutch 30 has a non-circular (non-annular) shape, namely, a triangular shape as a whole. An end surface 21 in the axial direction of an outer race 1 is annular. At least a portion of the end surface 21 in the axial direction of the outer race 1 is exposed in a state in which the side plate 40 having a central hole 45 passing through in the axial direction is secured. The side plate 40 is provided with through holes 48 which pass through in the axial direction, in which rivets 14 penetrate, and which are positioned in the vicinity of the apexes of the triangle. The rivets 14 are inserted in the through holes 48 and holes 8 of the outer race 1 and swaged thereby to secure the side plate 40 to the outer race 1.

Three exposed portions are formed between linearly trimmed portions 41, which form the three sides of the side plate 40, and the annular rim of the outer race 1. In the side plate 40, a material for the exposed portions can be saved.

As seen from FIG. 2 and FIG. 3, the trimmed portions 41 of the side plate 40 substantially cover pockets 4 of the outer race 1. Although the function for discharging foreign substances from the pockets 4 is not adequate, the material for the side plate 40 can be reduced and the yield can be improved.

Second Embodiment

Figure 4:
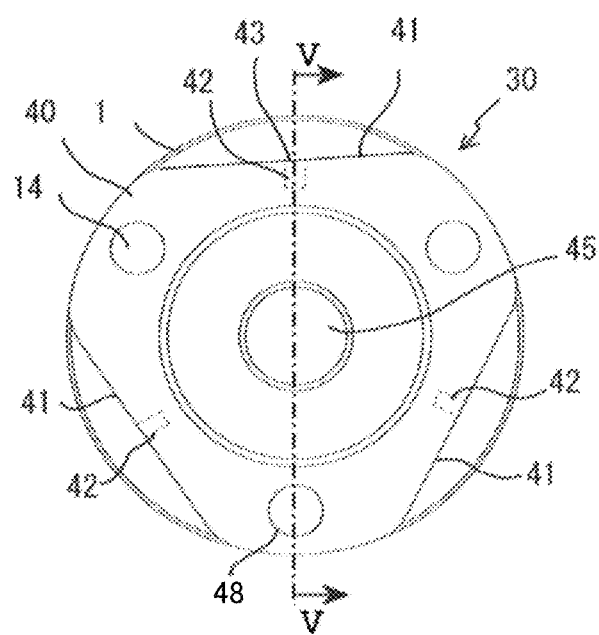
FIG. 4 is a front view illustrating a roller type one-way clutch according to a second embodiment of the present invention.
Figure 5:
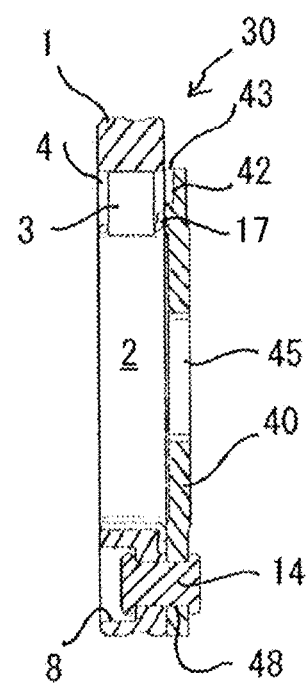
FIG. 5 is a sectional view in the axial direction taken along line V-V in FIG. 4.

FIG. 4 is a front view illustrating a roller type one-way clutch according to a second embodiment of the present invention, and FIG. 5 is a sectional view in the axial direction taken along line V-V in FIG. 4.

The second embodiment has the same basic configuration as that of the first embodiment. In the second embodiment, grooves 42 are formed in the surface portions substantially at the centers of three linearly trimmed portions 41 of a triangular side plate 40, the surface portions opposing pockets 4. The grooves 42 extending in the radial direction end on an inner side of the side plate 40 and open to the trimmed portions 41 at openings 43. The grooves 42 are provided one each at each of the trimmed portions 41.

As seen from FIG. 5, each of the grooves 42 ends at a position opposing the pocket 4. Thus, the pockets 4 are in communication with the outside through the grooves 42 and the openings 43. This allows foreign substances to be discharged from the pockets 4 to the outside through the grooves 42.

In the second embodiment, the material for the side plate 40 can be reduced, the yield can be improved, and foreign substances, such as abrasion powder and refuse, can be discharged from the pockets 4. The grooves 42 can be formed by press-working at the same time as when the side plate 40 is punched, so that there is no increase in the number of process steps.

Third Embodiment

Figure 6:
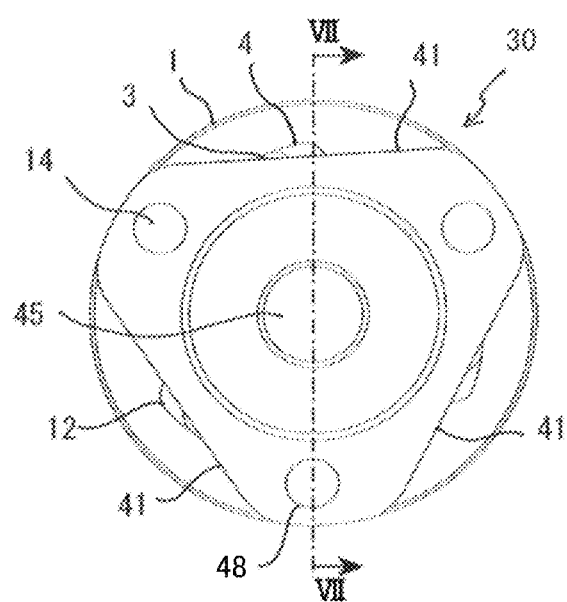
FIG. 6 is a front view illustrating a roller type one-way clutch according to a third embodiment of the present invention.
Figure 7:
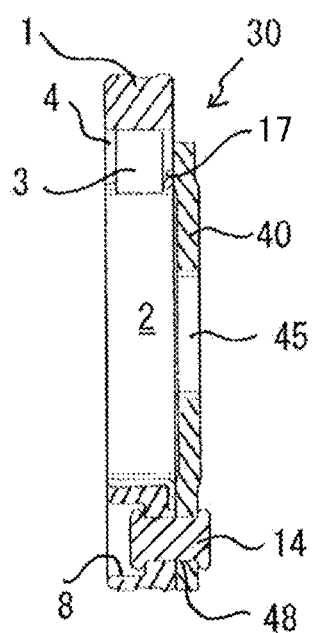
FIG. 7 is a sectional view in the axial direction taken along line VII-VII in FIG. 6.

FIG. 6 is a front view illustrating a roller type one-way clutch according to a third embodiment of the present invention, and FIG. 7 is a sectional view in the axial direction taken along line VII-VII in FIG. 6.

In the third embodiment, a side plate 40 is cut away more than that in the first embodiment and the second embodiment. Linearly trimmed portions 41 are formed adjacently to the center of the side plate 40. In the third embodiment, therefore, pockets 4 are partly exposed on the outside diameter side of the trimmed portions 41, and cam surfaces 12 are seen.

In order to maximize the effect for discharging foreign substances, the side plate 40 is preferably disposed such that a radially outermost portion of each of the pockets 4 is exposed. The third embodiment makes it possible to further reduce the material for the side plate 40, improve the yield and discharge foreign substances from the pockets 4.

Fourth Embodiment

Figure 8:
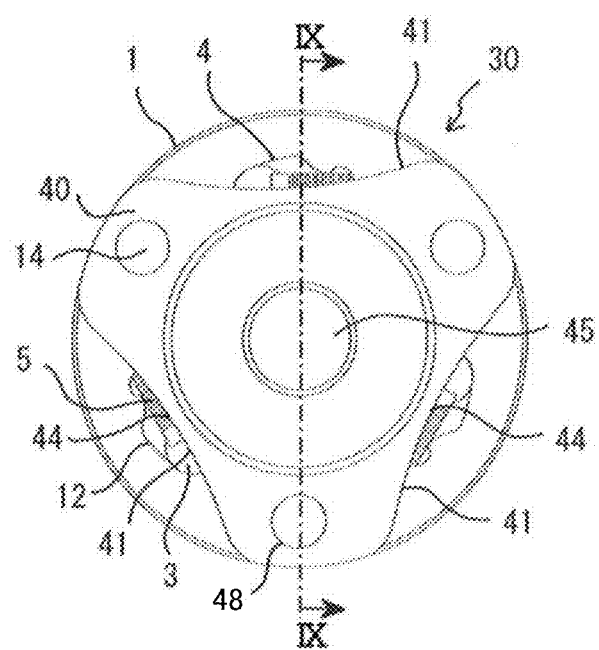
FIG. 8 is a front view illustrating a roller type one-way clutch according to a fourth embodiment of the present invention.
Figure 9:
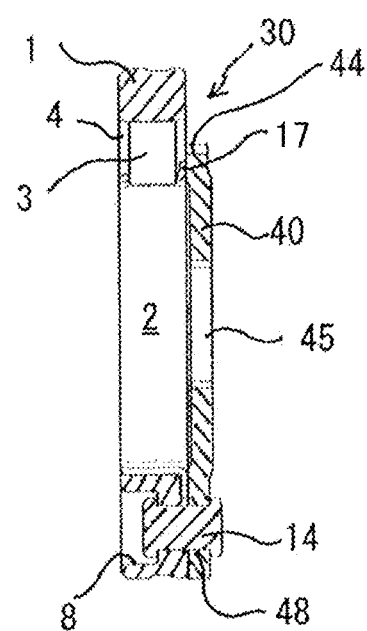
FIG. 9 is a sectional view in the axial direction taken along line IX-IX in FIG. 8.

FIG. 8 is a front view illustrating a roller type one-way clutch according to a fourth embodiment of the present invention, and FIG. 9 is a sectional view in the axial direction taken along line IX-IX in FIG. 8.

The fourth embodiment is a modification example of the third embodiment. Whereas the trimmed portions 41 are linear in the third embodiment, a side plate 40 in the present embodiment has curved portions 44, the curvatures of which toward the center of the side plate are maximized at the vicinity of the central portions of trimmed portions 41. Hence, the majority of each of pockets 4 is exposed on the outside diameter side of the trimmed portion 41.

As with the third embodiment, the side plate 40 is preferably disposed such that the radially outermost portions of the pockets 4 are exposed in order to maximize the effect for discharging foreign substances. The fourth embodiment makes it possible to reduce the material for the side plate 40 more than other embodiments, improve the yield, and provide higher effect for discharging foreign substances from the pockets 4. However, the side plate 40 has a function for preventing rollers 3 and springs 5 in the pockets 4 from falling off in the axial direction, so that the pockets 4 will not be entirely exposed.

The following modification examples of the embodiments described are possible. The triangular side plate 40 has been exemplified as the non-circular side plate. Alternatively, however, other non-circular shapes such as a rectangle or a pentagon can be adopted as a polygon other than the triangle. The side plate 40 may adopt any shape that exposes the end surface 21 in the axial direction at least partly when the side plate 40 is attached to the end surface 21 in the axial direction of the outer race 1.

Figure 10:
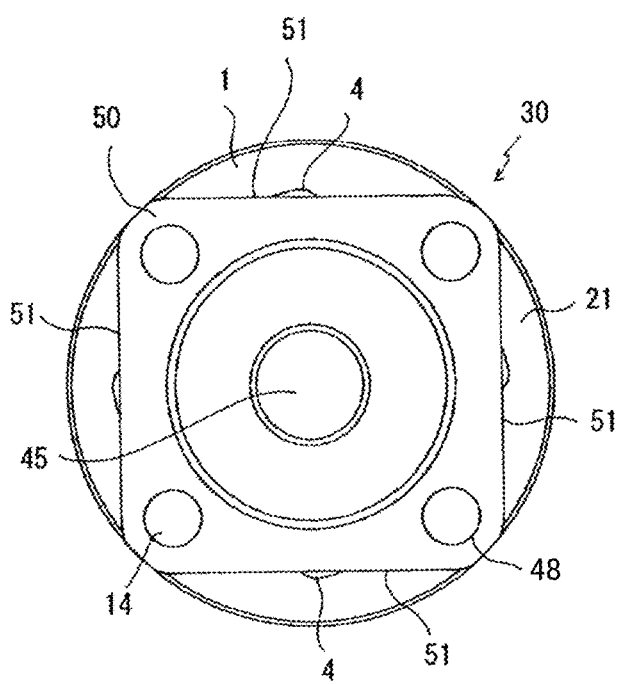
FIG. 10 is a front view of a roller type one-way clutch having a quadrangular side plate.

FIG. 10 illustrates a roller type one-way clutch 30 having a quadrangular side plate 50. The side plate 50 having a substantially square shape is secured to an end surface 21 in the axial direction of the outer race 1 according to the same method as that in the foregoing embodiments. The side plate 50 having four trimmed portions 51 is secured to the outer race 1 by rivets 14 around the four apexes.

Pockets 4 of the outer race 1 are disposed at four locations at equal intervals in the circumferential direction, corresponding to the quadrangular shape of the side plate 50. As illustrated in FIG. 10, pockets 4 are partly exposed beyond trimmed portions 51. In FIG. 10 also, the grooves 42 illustrated in FIG. 4 can be provided. Further, the trimmed portions 51 can be curved in the inside diameter direction to expose more of an end surface 21 in the axial direction and the pockets 4, as illustrated in FIG. 8.

The trimmed portions 41 and 51 of the side plates 40 and 50, respectively, can be used as the positioning indicators when swaging the rivets 14 to secure the side plates 40 and 50 to the outer races 1.

Further, if it is necessary to distinguish the front and the back of each of the side plates 40 and 50, through holes 48 (not illustrated for the side plate 50) may have different shapes or diameters for the front and the back so as to prevent erroneous assembly using a positioning tool. It is also possible to distinguish between the front and the back of each of the side plates 40 and 50 by using slightly different slopes for the right and the left of each of the trimmed portions 41 and 51 of the side plates 40 and 50.

Further, although the grooves 42 are formed by press-working, the grooves 42 can alternatively be formed by cutting. Further alternatively, the grooves 42 can be simultaneously formed at the time of forging the side plate 40 and the side plate 50.

The present application is intended to claim priority from Japanese Patent Application No. 2013-232077 filed on Nov. 8, 2013, the contents of which are incorporated herein by reference.

DESCRIPTION OF REFERENCE NUMERALS

1 Outer race
2 Inner race
3 Roller
4 Pocket
5 Spring
7 Side plate
6 Retainer
8 Hole
9 Spline groove
11 Outer periphery track surface of the inner race
12 Cam surface
14 Rivet
17 Flange of the retainer
18 Window of the retainer
21 End surface of the outer race
30 Roller type one-way clutch
40 Side plate
41 Trimmed portion
42 Groove
43 Opening
44 Curved portion
45 Central hole
48 Through hole
50 Side plate
51 Trimmed portion

The invention claimed is:

1. A roller type one-way clutch comprising:
an outer race in which at least one pocket having a cam surface on an inner periphery thereof is formed;
an inner race which is spaced away from the outer race on an inside diameter side in a radial direction and which is relatively rotatably disposed concentrically with respect to the outer race;
a roller which is disposed in the pocket and which engages with the cam surface to transmit a torque between the outer race and the inner race;
a spring which is disposed between the outer race and the roller in the pocket and which urges the roller in a direction in which the roller engages with the cam surface; and
a side plate secured in contact with an axial end surface of the outer race,
wherein the side plate has a polygon shape which has trimmed portions, each side of the polygon is linear, the axial end surface of the outer race is annular, and at least a part of the axial end surface of the outer race is exposed from the side plate in an axial end view.

2. The roller type one-way clutch according to claim 1, wherein the side plate has a triangular shape or a quadrangular shape.

3. The roller type one-way clutch according to claim 1, wherein the side plate is secured to the outer race at a vicinity of apexes of the polygon.

4. The roller type one-way clutch according to claim 1, wherein the side plate opposes a respective pocket at a central portion of each side of the polygon.

5. The roller type one-way clutch according to claim 1, wherein a respective pocket is exposed at a vicinity of a central portion of each side of the polygon.

6. The roller type one-way clutch according to claim 1, wherein the side plate has grooves, each of which extends in a radial direction in a surface which is at a center of each side of the polygon and which opposes the outer race, each groove having an open end at the corresponding side of the polygon.

7. The roller type one-way clutch according to claim 6, wherein the grooves are formed by press-working.

8. The roller type one-way clutch according to claim 6, wherein the grooves oppose radially outermost portions of corresponding pockets.

9. The roller type one-way clutch according to claim 1, wherein at least a part of the cam surface is exposed beyond the side plate in the axial end view.

10. The roller type one-way clutch according to claim 1, wherein the trimmed portion serves as a positioning indicator when the side plate is secured to the outer race.

11. A roller type one-way clutch comprising:
an outer race in which at least one pocket having a cam surface on an inner periphery thereof is formed;
an inner race which is spaced away from the outer race on an inside diameter side in a radial direction and which is relatively rotatably disposed concentrically with respect to the outer race;
a roller which is disposed in the pocket and which engages with the cam surface to transmit a torque between the outer race and the inner race;
a spring which is disposed between the outer race and the roller in the pocket and which urges the roller in a direction in which the roller engages with the cam surface; and
a side plate secured in contact with an axial end surface of the outer race,
wherein the side plate has a polygon shape which has trimmed portions, each side of the polygon is curved toward a center of the side plate, the axial end surface in of the outer race is annular, at least a part of the axial end surface of the outer race is exposed from the side plate in an axial end view, and at least a part of the cam surface is exposed from the side plate in the axial end view.

12. The roller type one-way clutch according to claim 11, wherein the side plate has a triangular shape or a quadrangular shape.

13. The roller type one-way clutch according to claim 11, wherein the side plate is secured to the outer race at a vicinity of apexes of the polygon.

14. The roller type one-way clutch according to claim 11, wherein the side plate opposes a respective pocket at a central portion of each side of the polygon.

15. The roller type one-way clutch according to claim 11, wherein a respective pocket is exposed at a vicinity of a central portion of each side of the polygon.

16. The roller type one-way clutch according to claim 11, wherein the trimmed portion serves as a positioning indicator when the side plate is secured to the outer race.

* * * * *